United States Patent
Juola et al.

(10) Patent No.: US 10,657,494 B2
(45) Date of Patent: May 19, 2020

(54) AUTHORSHIP TECHNOLOGIES

(75) Inventors: Patrick Juola, Pittsburgh, PA (US);
James Orlo Overly, Punxsutawney, PA (US); John Isaac Noecker, Jr., Schuylkill Haven, PA (US); Michael Ryan, Pittsburgh, PA (US); Christine Gray, Jefferson Hills, PA (US)

(73) Assignee: Duquesne University of the Holy Spirit, Pittsburgh, PA (US)

( * ) Notice: Subject to any disclaimer, the term of this patent is extended or adjusted under 35 U.S.C. 154(b) by 966 days.

(21) Appl. No.: 14/114,956

(22) PCT Filed: May 4, 2012

(86) PCT No.: PCT/US2012/036478
§ 371 (c)(1),
(2), (4) Date: Jan. 23, 2014

(87) PCT Pub. No.: WO2012/154540
PCT Pub. Date: Nov. 15, 2012

(65) Prior Publication Data
US 2015/0046346 A1 Feb. 12, 2015

Related U.S. Application Data

(60) Provisional application No. 61/518,518, filed on May 6, 2011.

(51) Int. Cl.
*G06Q 30/00* (2012.01)
*G06Q 10/10* (2012.01)
(Continued)

(52) U.S. Cl.
CPC ............ *G06Q 10/10* (2013.01); *G06F 21/31* (2013.01); *G06F 40/253* (2020.01); *G06Q 50/184* (2013.01); *G06F 2221/2131* (2013.01)

(58) Field of Classification Search
None
See application file for complete search history.

(56) References Cited

U.S. PATENT DOCUMENTS 7,558,774 B1 * 7/2009 Nakano ................ G06F 16/334
706/52
9,292,493 B2 * 3/2016 Chandramouli ...... G06F 17/274
(Continued)

FOREIGN PATENT DOCUMENTS

DE 19942082 A1 * 3/2001 ........... H04L 9/3247
JP 09-016697 A 1/1997
(Continued)

OTHER PUBLICATIONS

Abbasi & Chen, Writeprints: A Stylometric Approach to Identity-Level Identification and Similarity Detection in Cyberspace, ACM Transactions on Information Systems, vol. 26, No. 2, Article 7, published Mar. 2008.*
(Continued)

*Primary Examiner* — James A Reagan
(74) *Attorney, Agent, or Firm* — Barbara E. Johnson, Esq.

(57) ABSTRACT

Novel distractorless authorship verification technology optionally combines with novel algorithms to solve authorship attribution as to an open set of candidates—such as without limitation by analyzing the voting of "mixture of experts" and outputting the result to a user using the following: if z $(z=p_i-p_j\sqrt{p_i+p_j}-(p_i-p_j)^2/n)$ is larger than a first predetermined threshold then author j cannot be the correct author; or if z $(z=p_i-p_j\sqrt{p_i+p_j}-(p_i-p_j)^2/n)$ is smaller than a second predetermined threshold then author i cannot be the correct author; or if no author garners significantly more votes than all other contenders then none of the named authors is the author of a document in question—in a number of novel applications. Personality profiling and
(Continued)

authorship attribution may also be used to verify user identity to a computer.

2 Claims, 1 Drawing Sheet

(51) Int. Cl.
  *G06F 21/31*     (2013.01)
  *G06F 40/253*    (2020.01)
  *G06Q 50/18*     (2012.01)

(56) References Cited

U.S. PATENT DOCUMENTS

| | | | |
|---|---|---|---|
| 2006/0288225 A1 | 12/2006 | Jung et al. | |
| 2007/0239433 A1* | 10/2007 | Chaski | G06F 17/27 704/9 |
| 2007/0288458 A1* | 12/2007 | Kacmarcik | G06F 17/274 |

FOREIGN PATENT DOCUMENTS

| | | | | | |
|---|---|---|---|---|---|
| JP | 2003131555 A | * | 5/2003 | ............. | G09B 19/06 |
| JP | 2011141766 A | * | 7/2011 | ............. | G06F 17/21 |
| WO | WO-2007015869 A2 | * | 2/2007 | ............. | G10L 15/26 |

OTHER PUBLICATIONS

Hans van Halteren. Linguistic Profiling for Author Recognition and Verification. (Jan. 2004). Retrieved from IDS Jan. 16, 2020 (Year: 2004).*

Pavelec et al. Compression and stylometry for author identification. (Jun. 14-19, 2009). Retrieved online Aug. 10, 2019. https://ieeexplore.ieee.org/document/5178675 (Year: 2009).*

Abbasi & Chen, Writeprints: A Stylometric Approach to Identity-Level Identification and Similarity Detection in Cyberspace, ACM Transactions on Information Systems, vol. 26, No. 2, Article 7, published Mar. 2008. (Year: 2008).*

Luyckx, Kim et al., "Authorship Attribution and Verification with Many Authors and Limited Data," Creative Commons Attribution-Non-Commercial-Share Alike 3.0, CNTS Language Technology, University of Antwerp, Prinstraat 13, 2000 Antwerp, Belgium.

Hans van Halteren, "Linguistic Profiling for author recognition and verification," Proceedings of the 42nd Annual Meeting . . . , ACL '04 Morristown, NJ, USA.

De Vel et al, "Mining E-mail Content for Author identification Forensics," SIGMOD Record, ACM, NeW York, NY, US, (Dec. 1, 2001), vol. 30 No. 4.

Ying Zhao, et al, "Authorship Attribution Via Combination of Evidence," Advances in Information Retrieval pp. 661-669 (2007).

* cited by examiner

AUTHORSHIP TECHNOLOGIES

STATEMENT REGARDING FEDERALLY SPONSORED RESEARCH

This invention was made with government support under Grant No. OCI-1032683, awarded by the National Science Foundation. The Government has certain rights in the invention.

BACKGROUND OF THE INVENTION

Field of the Invention

The present invention pertains to novel computer-based methods for authorship verification and authorship attribution and novel computer-based methods of using authorship verification and attribution.

Description of Related Art

In the field of authorship attribution, there have so far been three initiatives of increasing difficulty, namely, the "closed set" question, the "open set" question, and the "attribution plus verification open set" question. The closed set question asks, "Whom among a finite known (i.e., closed) set of authors was the author of a given writing?" The open set question is, "Whom among a set of authors was the author of a given writing with the understanding that the answer could be 'none of the above'?" The more challenging question of the two questions is the latter, and the most challenging question is the ultimate open set question of verifying authorship as to only one candidate/suspect "A" but in a scenario for which the answer also could be "not A." Closed set authorship attribution is a relatively mature field, but the open set investigations of others have not to date yielded satisfactory results despite published efforts. For example, in Luyckx, Kim, et al., "Authorship Attribution and Verification with Many Authors and Limited Data," *Creative Commons Attribution-Noncommercial-Share Alike* 3.0, CNTS Language Technology Center, University of Antwerp, Prinsstraat 13, 2000 Antwerp, Belgium, 2008, representative of other contemporaneous prior art, the analysis presented distills to the question "is a text attributable to author A or to a definable 'somebody else'?" and such a question itself creates the impossibility of answering the question "none of the above." A need thus remains for computer-based authorship attribution and verification approaches that can solve open-set inquiries and also for methods of using authorship attribution and verification to reduce or solve otherwise intractable problems of daily living.

At the same time, however, the underlying authorship attribution/verification technology itself also requires innovation in the area of reliability in verifying authorship as to a single candidate, regardless of the open-set challenge. Up until now, the authorship attribution/verification technology itself has been beset in certain instances with certain potential flaws and/or unwarranted assumptions. The present invention is thus an improvement in wielding existing authorship attribution technology to function better in the open set, or "none of the above," context and also provides fundamental improvements to underlying authorship verification approaches in profound and surprising ways.

SUMMARY OF THE INVENTION

The present invention includes both a novel approach to authorship verification and an improved approach to wielding existing authorship attribution technology as follows. The novel approach to authorship verification includes in part, and as desired, using solely the candidate author's own prior writings as sample writing, without any distractor sets of any other authors' writings besides the candidate for whom authorship verification is sought. Furthermore, in wielding existing authorship attribution tools that use distractor sets in a novel way to achieve surprisingly improved results, a mathematical approach allows a pool of author candidates to be analyzed in such a way that the mathematical conclusion and output to a user can be "none of the above." The latter computer-based algorithm-containing system with output to a user includes (1) the use of at least two, preferably at least ten, more preferably at least 30 and most preferably at least 100 or more separate automated authorship attribution systems to analyze both a text in question and a plurality of texts comprising a distractor set of texts known to have been authored by a pool of potential authors considered as an open set; and (2) the use of a voter box or similar technology to compile the votes according to the at least two, preferably at least ten, more preferably at least 30 and most preferably at least 100 or more separate automated authorship attribution systems to quantify votes for each potential author in the open set; with determination of the author identity including the possibility of none-of-the-above by applying the following mathematical analysis (3): if $p_i$ is the proportion of votes for author i, and $p_j$ is the proportion of votes for another author j, with n as the number of experts and therefore n also represents the number of votes in total, then (a) when z ($z=p_i-p_j$/SE wherein SE=$\sqrt{p_i+-(p_j-p_j)^2/n}$ such that $z=p_i-p_j\sqrt{p_i+p_j-(p_i-p_j)^2/n}$ is larger than a first predetermined threshold chosen from a standard z table and the difference between $p_i$ and $p_j$ is significant, author j cannot be the correct author; or (b) when z ($z=p_i-p_j$/SE wherein SE=$\sqrt{p_i+p_j-(p_i-p_j)^2/n}$ such that $z=p_i-p_j/\sqrt{p_i+p_j-(p_i-p_j)^2/n}$ is smaller than a second predetermined threshold of −1 times the first predetermined threshold and the difference between $p_i$ and $p_j$ is significant, author i cannot be the correct author; or (c) no author garners significantly more votes than all other contenders and none of the named authors is the author of the document in question. In a yes/no verification situation but with an open set (is or is not author i the author of a document in question), author verification of i is conducted by determining whether votes for i exceed the mixture of experts votes for any other author in a distractor set or whether the votes for authors other than i in the distractor set are indistinguishable (within the desired error tolerance).

BRIEF DESCRIPTION OF THE DRAWINGS

FIGS. 1(*a*) through 1(*c*) are bar graphs which exemplify the tallied and quantified votes typical, when multiple authorship attribution technologies are compiled, of (a) verification of author "A," (b) attribution of authorship to one of B, C, D or E and (c) verification that authorship attribution is "none of the above."

DETAILED DESCRIPTION OF THE INVENTION

Figure 1A:
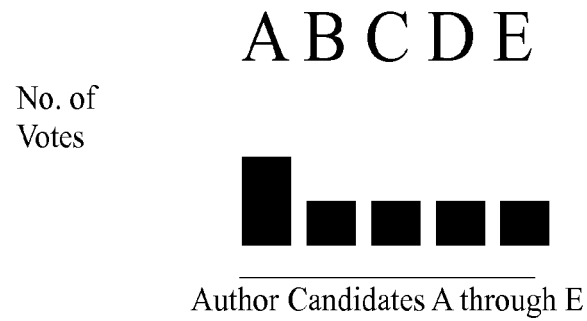
FIG. 1.

The present invention includes both a novel approach to authorship verification and an improved approach to wielding existing authorship attribution technology as follows. The novel approach to authorship verification includes in part, and as desired, using solely the candidate author's own prior writings as sample writing, without any distractor sets of other authors' writings besides the candidate for whom authorship verification is sought. Furthermore, in wielding existing authorship attribution tools that use distractor sets in a novel way to achieve surprisingly improved results, a mathematical approach allows a pool of author candidates to be analyzed in such a way that the mathematical conclusion and output to a user can be "none of the above." The latter computer-based algorithm-containing system with output to a user includes (1) the use of at least two, preferably at least ten, more preferably at least 30 and most preferably at least 100 or more separate automated authorship attribution systems to analyze both a text in question and a plurality of texts comprising a distractor set of texts known to have been authored by a pool of potential authors considered as an open set; and (2) the use of a voter box or similar technology to compile the votes according to the at least two, preferably at least ten, more preferably at least 30 and most preferably at least 100 or more separate automated authorship attribution systems to quantify votes for each potential author in the open set; with determination of the author identity including the possibility of none-of-the-above by applying the following mathematical analysis (3): if $p_i$ is the proportion of votes for author i, and $p_j$ is the proportion of votes for another author j, with n as the number of experts and therefore n also represents the number of votes in total, then (a) when z ($z=p_i-p_j/SE$ wherein $SE=\sqrt{p_i+p_j-(p_i-p)^2/n}$ such that $z=p_i-p_j/\sqrt{p_i+p_j-(p_i-p_j)^2/n}$ is larger than a first predetermined threshold chosen from a standard z table and the difference between $p_i$ and $p_j$ is significant, author j cannot be the correct author; or (b) when z ($z=p_i-p_j/SE$ wherein $SE=\sqrt{p_i+p_j-(p_i-p_j)^2/n}$ such that $z=p_i-p_j/\sqrt{p_i+p_j-(p_i-p_j)^2/n}$ is smaller than a second predetermined threshold of −1 times the first predetermined threshold and the difference between $p_i$ and $p_j$ is significant, author i cannot be the correct author; or (c) no author garners significantly more votes than all other contenders and none of the named authors is the author of the document in question. In a yes/no verification situation but with an open set (that is, "Is or is not author i the author of a document in question?"), author verification of i is conducted by determining whether votes for i exceed the mixture of experts votes for any other author in a distractor set or, by contrast, whether the votes for authors other than i in the distractor set are indistinguishable (within the desired error tolerance) as described further below.

Improved authorship attribution technology addressing the open set, or "none of the above," option pertains to the use of a particular novel mathematical approach to analyzing the results of a "mixture of experts" approach to authorship attribution. "Mixture of experts" itself was already known at the time of this invention in the context of closed set questions—one takes a number (and a great number if possible)—of existing authorship attribution approaches, applies them all to the closed set of candidates' sample texts, and use a "voter box" type resolution to determine authorship attribution. The voter box is a literal compiler of votes, because the mixture of experts means using a lot of, such as at least one hundred of or more preferably at least one thousand or more of, the 200,000 or more known authorship attribution approaches and applying them all, all at once. The benefit of using a mixture of experts instead of just one authorship verification approach is statistically straightforward, in that the mixture of experts approach tends to cancel out any errors or inaccuracies intrinsically attributable to any one single expert approach. However, in applying "mixture of experts" to an open set, the evaluation changes and the mathematics are no longer statistically straightforward nor were the mathematics known heretofore. By applying the novel mathematics, the inventive evaluation of "mixture of experts" as to an open set of author candidates can reliably reveal the answer "none of the above," whereas others who previously tried could not. A description of the novel mathematics follows.

In "mixture of experts," with a large pool of independent methods of document analysis (up to 200,000 or more) the statistical assumption is that each expert will perform better than chance, such that given a choice among N possible authors, the correct author will be chosen at least 1/N of the time, and each of the wrong (distractor) authors will be chosen at most 1/N of the time. At its heart, the novel mathematics analyze the document set with n different methods, yielding n different expert opinions or votes. In light of the stated assumption, then, in which the author most likely to be the correct author is the one selected by the plurality of experts, the mathematics address the margin of plurality to determine if the margin of plurality is significant and further to issue an appropriate overall conclusion as to authorship attribution.

For terminology, let $p_i$ be the proportion of votes for author i, and $p_j$ be the proportion of votes for another author j. With n as the number of experts, n also represents the number of votes in total. To test whether $p_i$ is "significantly" different from $p_j$, one can use a standard z-test, where the test statistic z is defined as: $z=p_i-p_j/SE$ (1), wherein SE is the "standard error," or the amount of difference between $p_i$ and $p_j$ that might be expected due to mere chance. SE is calculated using the formula $SE=\sqrt{p_i+p_j-(p_i-p_j)^2/n}$ (2). Thus, the final formula for z is given by $z=p_i-p_1/\sqrt{p_i+p_j-(p_i-p_j)^2/n}$ (3). If z is larger than a predetermined first threshold, we consider that the difference between $p_i$ and $p_j$ is significant and we conclude that author j cannot be the correct author. Similarly, if z is smaller than a second, smaller predetermined threshold, author i cannot be the correct author. The threshold(s) can be chosen from a standard z table to represent the highest chance of a false acceptance we are willing to tolerate. The larger and smaller thresholds are related in that the smaller threshold is simply −1 times the larger threshold.

In view of the terminology of the previous paragraph, open-class inference is accomplished mathematically as follows. As before, the z value returned from any single test represents the largest probability of error we are willing to tolerate. To determine whom among N authors is the correct author, we need to compare all authors against all other authors, a total of N(N−1)/2 comparisons. If our maximum overall error probability is $\alpha$, then we are willing to accept a maximum per-comparison error probability of $\alpha/(N(N-1)/2)$ at each trial (a number derived from the Bonferoni correction for multiple comparisons). We therefore select our z score cutoff to make sure that the maximum per-trial error probability is less than the Bonferroni-corrected alpha value. After establishing the cutoffs in the previously described way, it is then possible to interpret the distribution of votes in any of several ways. One way is to state that author A is the correct author of the document if $p_A$ is significantly greater than all other p as defined above. If no author garners significantly more votes than all other contenders, then not only is there not enough information to distinguish among the top vote getters but the inability of the votes to distinguish among the top vote getters in itself signifies that none of the named authors is actually the author of the document in question.

Figure 1B:
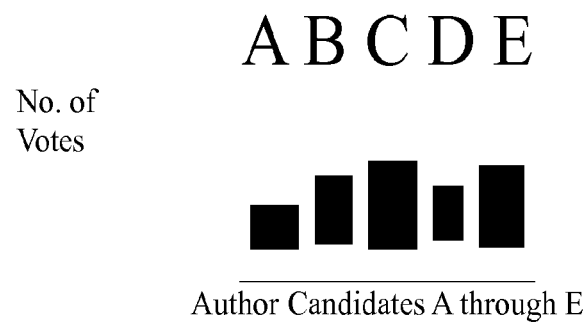
Figure 1C:
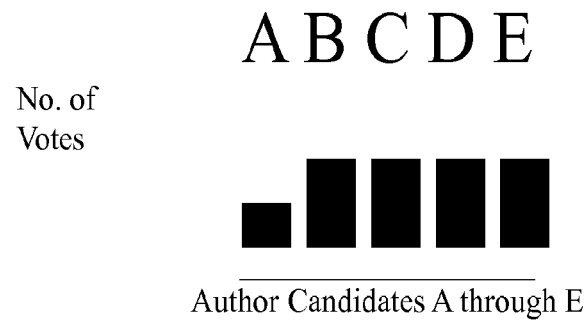

FIGS. 1(a), 1(b) and 1(c) provide a visual illustration of the above three statistical analysis possibilities. If one has a suitable distractor set writing samples from five authors A, B, C, D and E, and one is trying to determine whether "A"

wrote the text in question rather than any other member of the distractor set or "none of the above," the mixture of experts results and statistical analysis set forth above might turn out in one of three ways. For an exemplary five individuals A-E, one possible data set from mixture of experts analysis could be that as shown in FIG. 1(a), that is, the preponderance of votes for candidate A suggests that A is the author of the text in question. Similarly, in FIG. 1(b) the disparate voting overall suggests that candidate C, with the greatest number of votes, is likely the author of the text in question. However, in FIG. 1(c), the results guide the conclusion "none of the above" because the voting is indistinguishable among the top vote-getters. In other words, in FIG. 1(c), not only is there a paucity of votes for candidate A BUT ALSO the voting for the other candidates is adequately indistinct in magnitude among B-C-D-E such that the indistinctness itself suggests the outcome "none of the above," because if one of the other candidates B, C, D or E had likely been the author the intra-B-C-D-E voting could not have been nearly so uniform. In this way it is possible to visualize how with a mathematical approach it is possible to identify the numeric situation in which the preponderant-vote-getters' vote quantities are similar enough that the attribution experts do not discern among the individual preponderant-vote-getters and therefore the answer as to a given text is most likely "none of the above." The degree to which the preponderant-vote-getters' vote quantities are similar enough to suggest "none of the above" is in pertinent part what the above mathematics accomplish, within tolerances and thresholds which the equations themselves allow the investigator to set as desired. (Depending on the context of authorship attribution or verification, different tolerances and thresholds are inevitably implemented. Identifying plagiarism among students, for example, while important and never to be the subject of an inadequately supported allegation, will generally be supportable by less stringent error tolerances than, say, criminal evidence outcomes for which authorship attribution technology may be used as direct or adjunct evidence. Further discussion of applications of authorship attribution appear later in this specification.)

Turning now to authorship "verification" instead of attribution, authorship verification is simply the open-class or open-set problem with a single designated author A. We assume the existence of a dynamically generated set of distractor authors and apply a similar process to that described above. In this case, however, because we are not interested in the question of whether author B or author C is more likely to have written the document (by assumption, neither of them is actually the author, but they represent writing styles that may or may not be more similar to the writing style of the actual document's author than is the style of author A). For this reason, we need only perform (N−1) comparisons (author A against the (N−1) other authors), and the Bonferroni correction is less stringent because there are fewer comparisons. Using a Bonferroni correction for multiple comparisons, we find that the alpha level at which our individual tests must be conducted is $\alpha_{adj}=\alpha/(N-1)$, where N is the number of authors in the problem. Thus, for the individual test to be considered significant, p must be less than $\alpha_{adj}$. As before, we can then interpret the distribution of votes in several ways, based on several guiding principals. First, any author who receives significantly fewer votes than another is excluded as the author of the document. Second, any group of authors in which the individual authors receive about the same number of votes (that is, the difference in number of votes is not significant) are equally likely individually to be the authors and for that very reason are unlikely to be the author in the existence of one or more other credible candidates. Thus, when there is a clear vote winner who earns significantly more votes than any other candidate, that candidate is the author of a text in question. Where there are several equally likely front-runners, we conclude that the correct author WOULD HAVE earned significantly more votes than any other author and therefore the individual front-runners are unlikely to be the correct author. Losers, that is, low vote getters, are excluded as the author of a text in question.

At this writing, it is already within the skill of the art to use "mixture of experts" approaches and multiple—many multiple—types of authorship attribution software or technology all at the same time. However, until the description in this specification it has not been possible to analyze "mixture of experts" as described above to reach the conclusion "none of the above" given a set of possible authors. Although the present invention will often be practiced by deploying one thousand or more experts and compiling the votes of the experts for comparison, at a minimum the invention is practiced using at least two, preferably at least ten, more preferably at least 30 and most preferably at least 100 experts or more.

Regarding sample size for use in practicing the above-described mathematics, the proportions used in the inference step of the verification process must be the result of a sufficiently large number of trials in order to return reliable data concerning the true differences. Notwithstanding, it is important in rendering a practical technology to minimize the number of trials necessary to detect a given difference in the proportions discussed above. Using the error formula $E=z_c*SE$ (4) and using equation (2) above, one can solve for n, the number of trials, which takes the form (Equation (5)):

$$n = \frac{z_c^2[p_A + pi - (p_A - p_i)^2]}{E^2}.$$

In Equation (5) $z_c$ is the critical z-value appropriate for the $\alpha$ level of the experiment and E is the acceptable margin of error about the difference of proportions. Because each individual test will take place at an adjusted $\alpha$ value, the z-score $z_c$ here must also be adjusted. Thus, let $z_{adj}$ be the z-value that has the area of $\alpha_{adj}$ as defined earlier to its right. Let us also use the assumption that no author is a priori assumed to receive any greater proportion of votes than any other, i.e., $p_i=1/N$ for all i in the set of potential authors. Then the equation reduces to:

$$n = \frac{2z_{adj}^2}{E^2 N}.$$

Finally, if we assume E is inversely proportional to 1/N, we get $$n=2Nk^2z_{adj}^2,$$

where k is the proportionality constant between E and 1/N. Thus, as k increases, E decreases, and smaller true differences can correctly be identified at the expense of an increase in sample size. We are thus able to select as many or as few experts to consult as we need, based on the degree of difference we expect to find (k) and our required confidence level (z).

As mentioned above, then, an important difference between the above described statistical analysis of mixture of experts and previously published approaches is that the prior methods of others, prior to the present invention, inevitably distilled to the question "is the text attributable to author A or to a definable 'somebody else'?" and such a question itself creates the impossibility of answering the question "none of the above."

As an optional feature of the above, the distractor set is deliberately chosen from among content-similar material as the text in question—such as by an Internet portal search. Content similarity can be considered in layers—if all the text documents (both the text under investigation and the distractor set texts) are actually published newspaper articles, that would be one type of content similarity. If all the text documents are directed to a single subject (cancer diagnostics, maybe, or electric grid management in third world countries, say) then the common subject matter would give content similarity. If multiple levels of similarity are available, such as texts that not only all represent published newspaper articles but all the newspaper articles address (say) political unrest in a particular country, such would constitute especially uniform content-similarity. The point of pursuing content similarity is to amass a distractor set with the best content similarity available in the given instance. Using specifically content-similar distractor sets is an optional feature which, when employed, helps to remove possible error in the application of the individual expert authorship attribution efforts. However, this optional content similarity, when used, does not affect the above-described mathematics and statistics in analyzing the overall results of a mixture of experts analysis.

The same mathematics described above may be used not just for authorship attribution/verification only but may also be used in open-set analysis for author profiling. Author profiling is an investigation in which it is not important to identify the individual author but the investigator wants to know if the text were written by: a man or a woman?; a resident of a particular city?; a citizen of a particular country?, and etc. Other profiling categories mentioned, in a list which is not exhaustive, are: age; regional origin (as opposed to specific city or country); age group; and objectively quantifiable personality type (Myers-Briggs temperament analysis, for example, preferably to Rorschach test results, at least generally). Other profiling includes, without limitation, document date (when was the text written?), author's professional or educational background or level, skill set aptitude, socioeconomic derivation, and so on. The same mathematics that can discern authorship attribution among an open set of authors can also be used to discern a profile from among an open set of profiles (is he/she from Austin, Boston, Chicago, Dallas, Edinboro or none of the above?).

Referring to personality profiling in particular, a version of the present invention is particularly useful for computer access security as follows. There are various contexts in which a computer user verifies his or her identity to a computer. By way of nonlimiting example, one context is the typical "challenge question" approach to establishing identity before a computer or computer system will resend a lost or forgotten log-on password. Unfortunately, challenge questions have two main drawbacks, one being that the computer user may not be able to remember the answer to the question if the truthful answer is difficult ("my parents had two residences, so which address was my first residence address?") and the second being that historic information for individuals is more and more available online, so that mother's maiden name, the person's date of birth, and other typical challenge question answers no longer make for secure user identification. With personality profiling, confirming the identity of a computer user may be accomplished without the computer user's having to remember the answers to challenge questions. In one embodiment of this personality profiling security access invention, the computer asks the user a series of questions based on the Myers-Briggs Type Indicator at the time the security access to the computer is initially established. The initial scoring of the series of questions assigns a personality type to the user based on his or her answers to those questions. If a new user is signing up for an account, the computer will store the personality type assigned but not any of the answers that the user previously provided. When the user uses this security system to access security features later—such as a lost password—the computer program asks a subset of the original questions again, assigns a personality type to the user, and compares the assigned personality type to the stored personality type. The questions asked to regain access are a smaller sample of the initial questions used to create the account—probably only about 5-10 questions at the time of requested re-access. Because the questions used to regain access are just a sample of the original longer question list, there is a small margin of error that is allowed for access to be granted. The re-access question subset is chosen at random, so that if a person is denied re-access and tries again he or she will be asked different questions, so that the re-access attempter cannot simply continue to change the answers until they gain access. In other embodiments of the invention, the personality profiling does not need to be done with Myers-Briggs, although Myers-Briggs is well known, well-respected and easy to use in this context. Other personality profiling could be accomplished with, without limitation, Minnesota Multiphasic Personality Inventory (MMPI). The MMPI has deception detection which adds another layer of security to the program, when the MMPI is used to verify a user to a computer by matching question subset personality profiling to an initial established personality profile. Any other form of questioning that does not require memorized information could be used, as long as the questions and answers are used for the purpose of establishing a personality profile of the account creator and for the purpose of determining whether the personality profile of a subsequent re-access attempter matches the original stored personality profile. Personality verification for computer security access thus removes significant vulnerabilities and insecurities of intrinsic to challenge questions and their answers, and instead provides the opportunity for the re-access attempter to verify his or her identity by personality profile in a reliable, direct and real-time way.

In addition to the above-described personality profiling application, any or all of the authorship technologies of the present invention may be used to identify a user to a computer or computer system, for security purposes. For example, by using a keystroke monitor or similar device to monitor the language used by a person using the computer's keyboard (or even speech recognition software), the analysis described throughout this specification may be used to verify the identity of a user to a computer by identifying the authorship attribution of the user. Such authorship-technology-governed computer access can be active, passive, sporadic, or ongoing. For example, the authorship technology can monitor all text entered on a given keyboard, or can assess a single challenge-type entry of text (in, say, an e-mail or other document). For computer user identity verification, the invention gives preference to ongoing direct text entry (or speech recognition transcription) to prevent imposters from introducing a plagiarized text for false identification. Clearly, ongoing monitoring of text (or speech transcription) entry is preferable to analyzing short or one-time challenge texts, because a suspected imposter might be able to supply postured or altered text for a short period of time, but not in an ongoing manner throughout typical day-in-day-out computer usage.

In the course of completing the above innovations, the inventors also developed additional features of and applications for authorship attribution technology. One of these new technologies is e-mail spam prevention, as follows. The most practical solution to the problem of e-mail spam generation is for an e-mail hosting entity deliberately to catch the spam e-mail (or similar "Astroturf" or viral marketing or similar misleading communications) with one or more authorship verification approaches at the source, prior to initial transmission. In other words, with authorship verification software in place an e-mail hosting entity can prevent the initial sending of an e-mail from a thieved e-mail account by catching the imposter-authored e-mail as having been authored by someone other than the e-mail account holder, whose authorship stylometrics have already been established. By stopping a phony or imposter e-mail message before it can even be sent—rather than to rely on spam-filters used by the e-mail recipients, after the spam e-mail may well already have been replicated millions or billions of times—a huge savings in electronic bandwidth and computer memory capacity is achieved.

For use in the previous e-mail spam prevention application as well as other applications, a unique "distractorless" authorship verification technology is particularly appropos. Rather than collecting the heretofore inevitable comparison writing samples from B-C-D-and-E to give a contrast or distraction ("distractor set") from the writing sample of author suspect A, the distractorless approach jettisons the distractor set altogether and authorship verification stylometrics are compared to the suspected author's own known prior writing samples only. In other words, in the novel "distractorless" technology the only basis for comparison of a text for which the question is "did A write this text or not?" is A's own prior acknowledged written text(s). In theory, although there is no intention of being bound by the theory, no one previously thought to dispense with the distractor sets because the use of distractor sets in authorship attribution approaches thus far has been so ubiquitous that no one has considered the possibility, heretofore, that they might not be a necessary basis for comparison. Surprisingly, when one uses only the suspected author's own prior writings as a basis for comparing a sample text for which the question is, "Did A write this or not?," one obtains results as or more reliable as any other approach to authorship verification. The distractorless innovation distills, then, to use any known authorship verification process while eliminating the distractor set in favor of stylometric comparisons made solely to the candidate author's own prior writing. By eliminating the distractor set, it is even possible to verify which if any portions of a sample text have been authored by a given author—maybe the first part but not the second half, and so on, all just by comparing the stylometrics of portions of any sample text to the author's known writings. An Example of the implementation and mathematical analysis of the distractorless embodiment of the present invention appears in Appendix A, as an example. Using the distractorless method, we achieved maximum accuracies, precision, recall and (Scores as good or better than both traditional closed-set authorship application methods and the mixture-of-experts verification methods described elsewhere in this patent specification.

As an important aspect of the invention disclosed herein, the inventors have identified new applications for authorship technology even beyond preventing e-mail spam generation at its source. As an additional example among many (see below), part of the invention is an adjunct medical mental health diagnostic application of authorship attribution, because text profiling can discern content suggesting inclination to suicide, bipolar disorder, schizophrenia, depression, dementia and anti-social/borderline personality disorder type tendencies, all in ways that can complement other diagnostic approaches. The stylometrics of a text in question are compared to the previously compiled stylometrics generally consistent with writers having confirmed diagnoses of mental health conditions. The power of adjunct profiling is particularly profound in a post-Facebook, post-Twitter milieu in which an individual's authored texts can be reliably accessed with little or no knowledge or active participation by the candidate or subject, let alone any conscious or sub- or unconscious effort by the candidate or subject to alter his or her writing style to affect or thwart authorship analysis. Further additional applications of the authorship technologies disclosed herein, as well as new applications of known authorship technologies—all preferably deployed with the unobtrusive subject author writing analysis conducted with little or no knowledge or active participation by the candidate or subject—include: plagiarism detection and/or prevention; complementary physical health assessment such as evaluating NFL players for concussion; detection or prevention of posting-while-intoxicated (or otherwise impaired); detection or prevention of account sharing; target marketing (such as screening individuals' Facebook or other electronic media posts for market category evaluation); detection or confirmation of first language; detection or verification of age or age range; pre-employment personality screening; detection of fraudulent applications for employment, licensure or certification; compatibility screening for employment, dating or other matching type Internet sites; or detection or prevention of workplace security incidents such as anger eruptions, workplace violence, espionage, sabotage, fraud, theft, security violations, general criminal conduct or work policy violations. A further specialized application is in the initiating or maintaining of human relationships. Because people with similar language styles are more likely to initiate and maintain relationships, the present methods may be used as screening and teaching tools to enable dating or matching services to connect two or more people with similar language styles, or in turn to enable individuals in relationships to study and learn to adapt their speech patterns to strengthen their relationships—thus making the inventive technology into both a diagnostic tool and a treating instruments for marriage counseling, team building and other relationship analysis or building applications.

The following example is illustrative.

Example 1

In traditional authorship attribution, our task is to assign an author label (or a similar categorical label like genre, publication date, etc.) to a work of unlabeled authorship. In the closed-set problem, we assign a label from a set of potential authors for whom we have some labeled training data. In the open-set problem, our answer may include "none of the above." We build upon this with the authorship verification task, which is essentially an open-set problem with only one author in the candidate pool. Thus, for a given document D and author A, we attempt to answer the question, "Was D written by A?"

Previous approaches to this problem generally involve creating a distractor set, which is normally controlled for genre, tone, length, etc. and performing an analysis to see whether the unlabeled document is more likely to be by the candidate author or one of the authors in the distractor set. This approach is non-ideal because it is so heavily dependent on choosing an appropriate distractor set. The following describes a method in which a distractor set is not necessary.

The Goal: Given a document D, and a candidate author A, determine the likelihood that D is written by A.

The Method: Compile a set of training data, which is known to be written by A. Compile a model from the training data. This is normally accomplished by extracting linguistic or token-level features from the text and compiling a feature vector using any of various standard techniques from the authorship attribution field. This feature is then labeled M=, m1, m2, . . . , mn>. Extract a feature set, F, from D in the form of F=<f1, f2, . . . , fn>, where fi corresponds to mi for all i. Choose a "distance-like" function, δ, such that if δ(x,y)<δ(x,z), we can say that y is "close to" or "more similar to" y than to z (in some meaningful way). Choose a threshold, t, such that if δ(M,F)<=t, we accept the premise that M and F are written by the same author, A. This threshold is found empirically by analyzing the average δ values between documents by the same author. To improve accuracy, a second threshold, p<t, may be chosen. In this case, we say that A wrote D only if δ(M,F)<=p. If p<=δ(M,F)<=t, we decline to answer (essentially, "I don't know"). If δ(M,F)>t, we say that A did not write D.

The benefit of the immediately above described method over distractor-set authorship verification is that it depends only on the candidate author, without the requirement to assemble a realistic set of distractor authors. The method outlined here is only the most basic implementation of the distractorless verification. For example, instead of a distance-like function we could use another standard machine learning algorithm, such as support vector machines, which can output a "confidence rating." We could also turn the yes/no/(unknown) problem into a confidence rating scale (i.e. instead of saying, "Yes," we could say "90% probability"). We can also use additional analysis to improve the accuracy of our system. For instance, if we have a relatively large sample of the candidate author's writing, we can determine t and p by analyzing the range of distances between the author's model and each document known to be written by that author.

Results: Several experiments have been performed on the 2011 PAN corpus, a subsection of the ENRON e-mail corpus that was used for a plagiarism detection competition in September of 2011. For completeness, the following is a specific example of the results of the application of the above-described method.

To create a feature vector, we first processed the corpus to convert all white spaces (e.g., spaces, tabs, new lines) into a single space, and converted all characters to lowercase. We then extracted character 10-gram features using a sliding window, and the feature vectors were constructed from the average relative frequencies of each character 10-gram per author (in authorship attribution lingo, this is a nearest neighbor centroid document model with character 10-grams). For δ, we used a normalized dot-product (Cosine Distance). That is, δ is defined according to the following Formula.

$$\delta(M, F) = \frac{M \cdot F}{|M||F|} = \frac{\sum_{i=1}^{n} m_i f_i}{\sum_{i=1}^{n} m_i^2 \sum_{i=1}^{n} f_i^2}$$

Using this particular method, we achieved a maximum accuracy of 91% (for completeness, t=p=0.000197 . . . , precision=75%, recall=15%, fScore=25%). This is significantly better than current best-performing results with traditional closed-set authorship application methods and the Overly mixture-of-experts verification methods (compare with 77% accuracy, the highest performing distractor-set method).

The invention claimed is:

1. A method for increasing the efficiency of a computer's verifying authorship of a first writing D, comprising computer-driven comparison of stylometrics in said first writing for which authorship verification is desired to stylometrics in at least one known authored material attributable to an author candidate for whom verification or negation of authorship of said first writing is desired, wherein only those writings of said author candidate are used for such comparison, comprising the steps of:
   a) compiling a set of training data known to be written by author A by selecting at least one text authored by A and inputting said text into a computer such that said text constitutes said training data;
   b) compiling via computer model from said training data by extracting linguistic or token-level features from said training data to create a feature vector and labeling said feature vector M=<m1, m2, . . . , mn>;
   c) extracting a feature set, F, from said writing D for which authorship verification is desired, in the form of F=<f1, f2, . . . , fn>, where fi corresponds to all mi for all i;
   d) choosing a distance function, δ, such that if δ(x,y)<δ(x,z), then x is "close to" or "more similar to" y than to z; and
   e) assigning a threshold, t, by empirically analyzing the average δ values between writings authored by A, such that if δ(M,F)≤t, we accept that d and the training data are written by the same author, A, and, wherein when a second threshold p is added, with p<t, the authorship is accepted only if δ(M,F)≤p, and if p≤δ(M,F)≤t, an answer is declined, whereupon the results of step e) are output to a user, and further wherein by using only those writings of said author candidate for comparison the method yields benefits not possible with computer comparisons conducted with use of writings of two or more author candidates, followed by said method steps a) through e) resulting either or both of verification of an author's identity or verification of authorship of one or more texts as a consequence of said method steps.

2. A method for increasing the efficiency of a computer's verifying authorship of a first writing D, comprising computer-driven comparison of stylometrics in said first writing for which authorship verification is desired to stylometrics in at least one known authored material attributable to an author candidate for whom verification or negation of authorship of said first writing is desired, wherein only those writings of said author candidate are used for such comparison, comprising the steps of:
   a) compiling a set of training data known to be written by author A by selecting at least one text authored by A and inputting said text into a computer such that said text constitutes said training data;
b) compiling via computer model from said training data by extracting linguistic or token-level features from said training data to create a feature vector and labeling said feature vector M=<m1, m2, . . . , mn>;
c) extracting a feature set, F, from said writing D for which authorship verification is desired, in the form of F=<f1, f2, . . . , fn>, where fi corresponds to all mi for all i;
d) choosing a distance function, $\delta$, such that if $\delta(x,y) < \delta(x,z)$, then x is "close to" or "more similar to" y than to z; and
e) selecting a monotonically decreasing function C(x) such that C(($\delta$(M,F)) is the probability or confidence that D and the training data are written by the same person, and rendering said data as an output to a user, and further wherein by using only those writings of said author achieves benefits not possible compared to computer comparisons conducted with use of writings of two or more author candidates, followed by said method steps a) through e) resulting either or both of verification of an author's identity or verification of authorship of one or more texts as a consequence of said method steps.

* * * * *